Oct. 16, 1923.  
R. H. STEVENS  
1,470,945  
BOLL WEEVIL EXTERMINATOR  
Filed Dec. 6, 1922  2 Sheets-Sheet 2
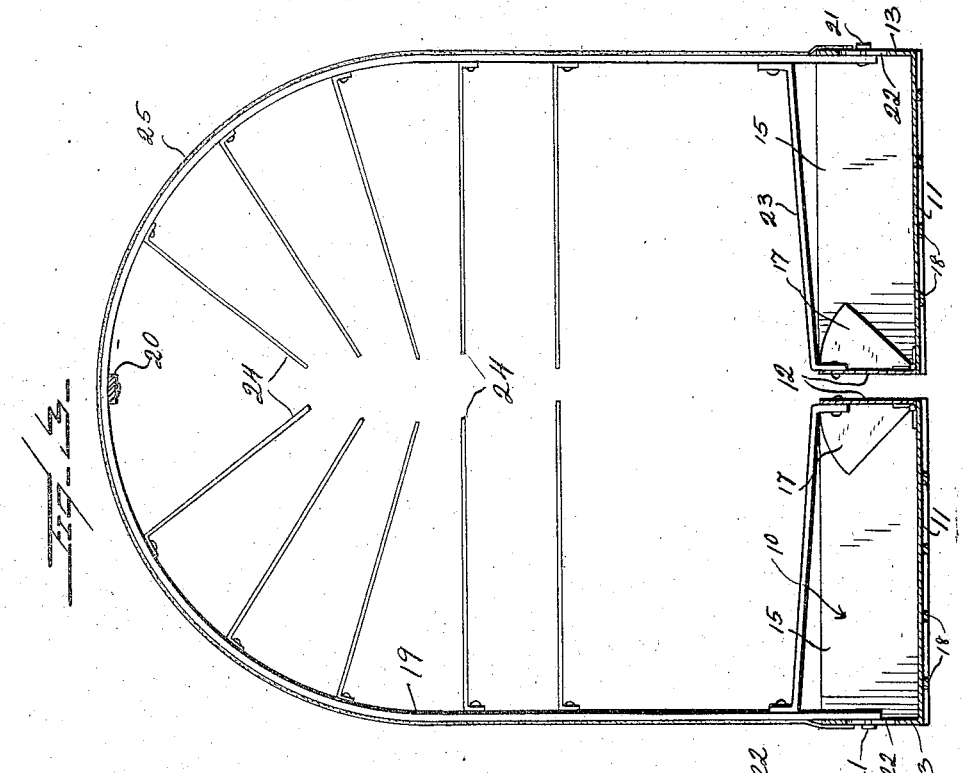
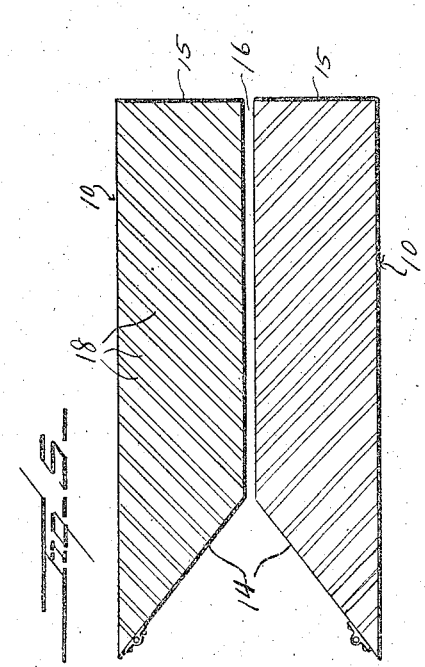
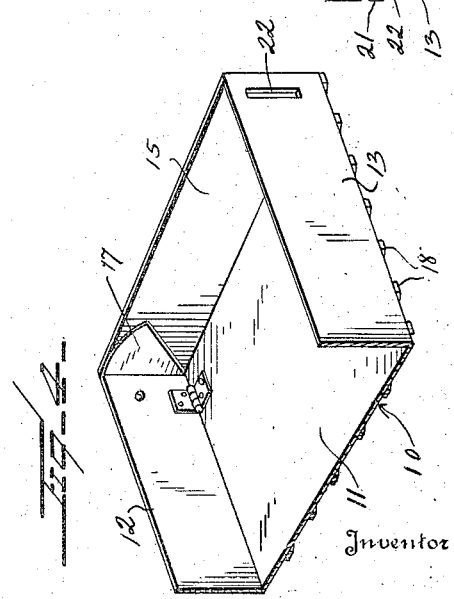
Inventor  
R. H. Stevens  
By Watson E. Coleman  
Attorney Patented Oct. 16, 1923.

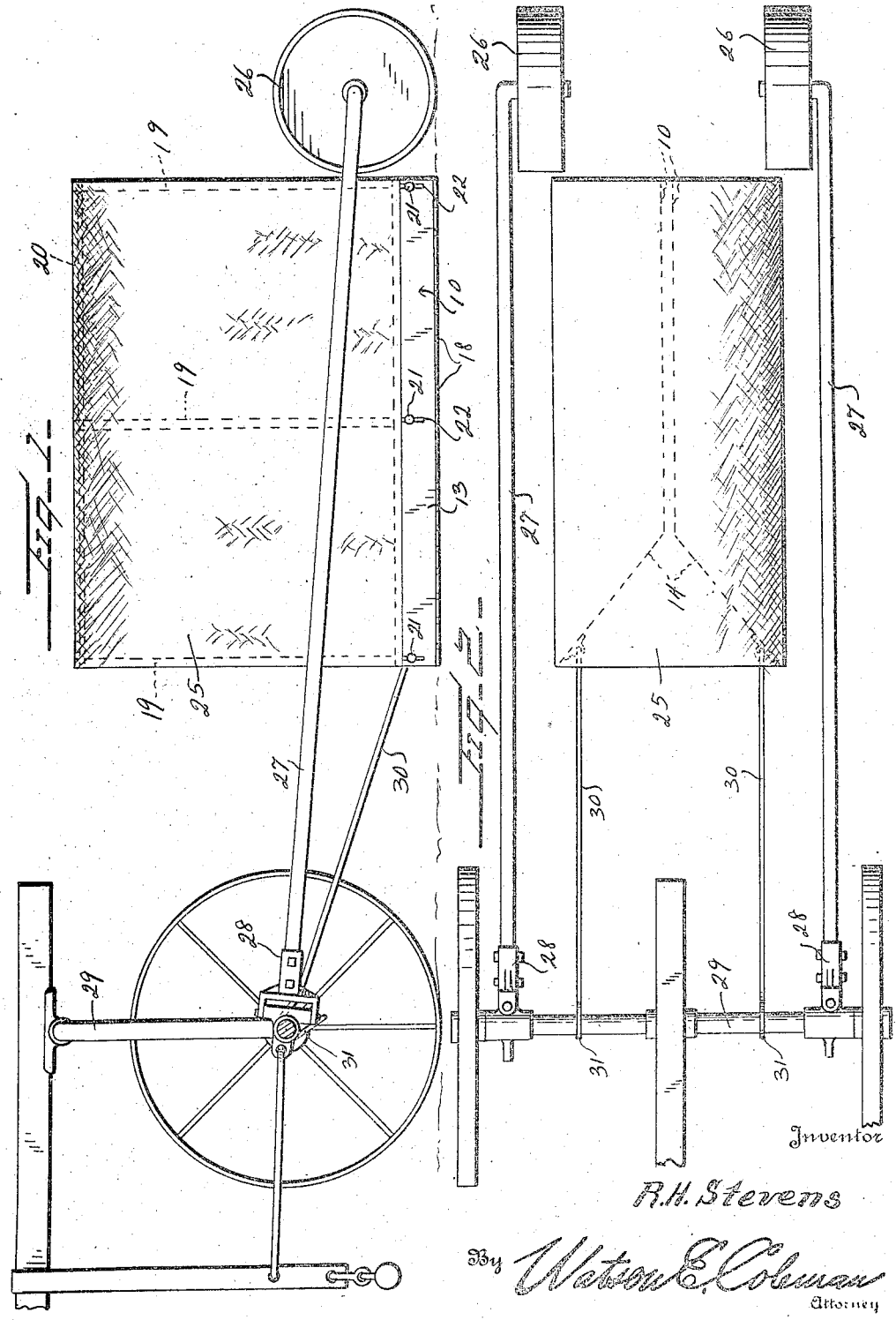

1,470,945

UNITED STATES PATENT OFFICE.

ROBERT H. STEVENS, OF NEAR NEWALLA, OKLAHOMA.

BOLL-WEEVIL EXTERMINATOR.

Application filed December 6, 1922. Serial No. 605,187.

*To all whom it may concern:*

Be it known that I, ROBERT H. STEVENS, a citizen of the United States, residing near Newalla, in the county of Pottawatomie and State of Oklahoma, have invented certain new and useful Improvements in Boll-Weevil Exterminators, of which the following is a specification, reference being had to the accompanying drawings.

This invention relates to boll weevil exterminators and more particularly to a device of this type adapted to collect the weevils from the plants by contact therewith.

An important object of the invention is to provide a device of this character which will as nearly as is possible remove all of the weevils from the plants.

It is well known to those familiar with devices of this character and their use that where an instrument is drawn along a row of cotton plants which by its engagement therewith knocks the weevils from the plants into a pan or similar receptacle where they may be destroyed from time to time, the animals or persons drawing the instrument along the row, during their contact with the plants of the row, knock from the plants certain of the weevils which being upon the ground are not collected and returning to the plants breed and thus destroy the work done in removing a certain percentage of the weevils from the plants, and an object of this invention is accordingly the provision of a device of this character which not only embodies a pan for receiving those weevils actually knocked off by the contact but which engages the ground in such manner as to collect the weevils which may have been knocked from the plants during prior passage of draft animals or the like and so places the same that they may be readily destroyed.

A further object of the invention is to provide a device of the above character having means positioned to destroy the weevils collected from the ground.

A still further object of the invention is to provide a device of this character which simultaneously with the removal of the weevils from the plants, collects and disposes between rows dead squares laying on the ridges at the rows and in the middles between the rows, throwing these squares to the centers of the rows where they are pressed into the ground and destroyed. The importance of this feature will be appreciated when it is pointed out that in many instances these dead squares have weevils thereon.

An additional object of the invention is to provide a device of this character which may be readily applied to the type of cultivator ordinarily employed for cultivating cotton fields and without in any manner altering the construction thereof.

These and other objects I attain by the construction and arrangement shown in the accompanying drawings wherein for the purpose of illustration is shown a preferred embodiment of my invention and wherein like reference characters designate like parts throughout.

In the drawings:—

Figure 1 is a side elevation of a boll weevil exterminator constructed in accordance with my invention;

Figure 2 is a plan view thereof;

Figure 3 is a transverse sectional view therethrough;

Figure 4 is a bottom plan view of the pan; and

Figure 5 is a perspective of a portion of one thereof.

Referring now more particularly to the drawings, the numeral 10 designates a pair of pan structures, each pan embodying a base 11, inner and outer sides 12 and 13 and front and rear ends 14 and 15. The inner side 12 of each of the pans is shorter than the outer side thereof, the excess length of the outer side being disposed at the forward end of the pan so that the forward edge 14 of the pan inclines rearwardly in the direction of movement of the pan and toward the space 16 between the pans formed as hereinafter described. The inner wall 12 of the pan is pivoted to the base and is preferably provided at its ends with slides 17 embracing the front and rear walls of the pan for maintaining engagement between these walls during pivotal movement of the inner wall 12. Secured to the under surface of the base 11 of each of the pans are diagonally arranged strips 18 inclining from the inner edge of the base rearwardly toward the outer edge thereof and preferably terminating at such outer edge.

The numeral 19 designates a plurality of arch members each substantially of the shape of an inverted U, the arch members being secured together by longitudinally extending braces 20. Each arch member is provided upon the ends of its leg with a hook portion 21 operating in a slot 22 formed in the outer wall 13 of one of the pans 10, the hook of one arm engaging in the slot 22 of one of the plans 10 while the hook of the other arm is engaged in the corresponding slot 22 of the other of the pans. Each arm has secured thereto adjacent its lower end an inwardly extending brace member 23, the inner end of which is rigidly secured to the pivoted inner wall 12 of the pan. These arms have further secured thereto a plurality of flexible snapper arms 24, the purpose of which will presently appear.

In use, the arch members 19 and braces 20 will be covered by a covering of fabric 25 to prevent weevils knocked from the plants from passing beyond the outer edge of the pan. It will be seen that if a structure in accordance with the foregoing is drawn along a cotton row, the inclined forward ends of the pans will cause the cotton plants to pass between the pans where they will be engaged by the snapper arms 24. This engagement causing abrupt striking and snapping of the twigs and leaves of the plants will cause the weevils to fall from the plants into the pans where they are collected until they may be destroyed. The arches 19 are so constructed that just sufficient room is provided to permit of passage of the cotton plants of the row therebetween and accordingly the inner edge walls 12 of the pan will be arranged in close proximity to the plants. The superstructure as represented by the arches 19 and the covering 25 together with the arms 24 will be maintained in substantially vertical position at all times by the plants and since the arms of the arches 19 are rigidly connected with the inner edges of the pans, these inner edges of the pans will likewise be maintained in substantially vertical position and at all times in close engagement with the stalks of the plants, thereby leaving but a slight space between the adjacent edges of the pan through which weevils may fall to the ground. The hook and slot engagement of the lower ends of the arms with the outer edges of the pans permits these pans at all times to maintain a close engagement with the ground, allowing these outer edges to rise and fall to compensate for ridges or hollows in which the cotton plants may lie. Accordingly, the diagonal strips 18 are at all times closely engaged with the ground and engage the same from the base of the plants to a point approximating the center of the middle between the rows and all loose articles upon the ground, such as dead squares, weevils and the like, will accordingly be swept from beneath the plants to a point at the center of the row. In order to provide for the destruction of weevils and squares thus forced to the center of the row, I provide heavy bull or tracker wheels 26 following the outer edges of the pans immediately rearwardly thereof and passing above articles discharged from the outer edge of the diagonal strips 18 to crush and destroy the same.

In order that an especially constructed draft mechanism for the device need not be provided, I form these bull wheels with forwardly extending reach arms 27 which are adapted to engage the collars 28 of the type of cultivator usually employed for cultivating cotton fields. This cultivator is provided centrally with an arch 29 which straddles the row during cultivation and to this arch I connect the pans 10 by means of pivoted links 30 secured at their rear ends to the forward ends of the pans 10 and adapted at their forward ends for engagement with this arch as by a hook 31.

It will be seen that a boll weevil destroyer constructed in accordance with my invention may be readily applied to a cultivator of this type and without altering the construction thereof, the collars 28 forming a normal portion of the construction of the cultivator and being ordinarily adapted for engagement with the gang sections of the cultivator which are not herein illustrated. It will furthermore be obvious that by the use of a device as above set forth, the escape of weevils by falling to the ground between or in advance of the pans is practically eliminated and accordingly the extermination is much more thorough than in those types of exterminators where the ground engagement is not provided. It will likewise be obvious that many changes in the structural details of the device hereinbefore set forth are possible without in any manner departing from the spirit of my invention and I accordingly do not limit myself to such specific structure except as hereinafter claimed.

I claim:—

1. In combination, a superstructure adapted to engage cotton plants and by its engagement therewith to remove weevils therefrom, a pair of pans carried by the superstructure and adapted to be arranged upon opposite sides of a row of cotton plants and to receive weevils removed from the plants by the superstructure, and means carried by the base of the pans for engaging the ground beneath the plants to remove loose articles therefrom and deposit the same at the center of the rows together with means following the pans for destroying loose articles thus deposited.

2. In combination, a superstructure adapted to engage cotton plants and by its engagement therewith to remove weevils therefrom, a pair of pans arranged beneath the superstructure and adapted to pass upon opposite sides of a row of plants and receive weevils removed from the plants by the superstructure, and means for engaging the ground beneath the plants to remove loose articles therefrom and deposit the same at the center of the row for destruction.

3. In combination, a superstructure adapted to engage cotton plants and by its engagement therewith to remove weevils therefrom, a pair of pans arranged beneath the superstructure and adapted to pass upon opposite sides of a row of plants and receive weevils removed from the plants by the superstructure, means carried by the pans engaging the ground beneath the plants to remove loose articles therefrom and deposit the same at the center of the row for destruction.

4. In combination, a superstructure adapted to engage cotton plants and by its engagement therewith to remove weevils therefrom, a pair of pans arranged beneath the superstructure and adapted to pass upon opposite sides of a row of plants and receive weevils removed from the plants by the superstructure, means carried by the pans engaging the ground beneath the plants to remove loose articles therefrom and deposit the same at the center of the row for destruction, and a supporting connection between the pans and the superstructure permitting limited oscillation of the pans with relation to the superstructure whereby to maintain said ground engaging means in engagement with the ground.

5. In combination, a superstructure adapted to engage cotton plants and by its engagement therewith to remove weevils therefrom, a pair of pans arranged beneath the superstructure and adapted to pass upon opposite sides of a row of plants, a connection between the pans and the superstructure supporting the superstructure and maintaining the adjacent edges of the pans in substantial alignment with the stalks of the plants, and means carried by the bottom of the pans and engaging the ground beneath the plants for removing loose articles therefrom and depositing the same at the center of the row for destruction.

6. In combination, a superstructure adapted to engage cotton plants and by its engagement therewith to remove weevils therefrom, a pair of pans arranged beneath the superstructure and adapted to pass upon opposite sides of a row of plants, a connection between the pans and the superstructure supporting the superstructure and maintaining the adjacent edges of the pans in substantial alignment with the stalks of the plants, inclined strips upon the bottom of the pan inclining from the inner edge of the pan toward the rear, and means following the pans and aligned with the outer edges of said strips for passing over articles directed outwardly thereby.

7. In combination, a superstructure adapted to engage cotton plants and by its engagement therewith to remove weevils therefrom, a pair of pans arranged beneath the superstructure and adapted to pass upon opposite sides of a row of cotton plants and to receive weevils removed from the plants by the superstructure, a connection between the superstructure and the inner walls of the pans for maintaining said inner walls in substantial parallelism to the stalks of the plants of the row, including a pivotal connection between said inner walls and the base of the pans, a slot and pin engagement between the superstructure and the outer walls of the pan, and means carried by the bottom of the pans for engaging the ground and directing loose articles thereon outwardly from the plants of the row into the middles.

8. In combination, a superstructure adapted to engage cotton plants and by its engagement therewith to remove weevils therefrom, a pair of pans arranged beneath the superstructure and adapted to pass upon opposite sides of a row of cotton plants and to receive weevils removed from the plants by the superstructure, a connection between the superstructure and the inner walls of the pans for maintaining said inner walls in substantial parallelism to the stalks of the plants of the row, including a pivotal connection between said inner walls and the base of the pans, a slot and pin engagement between the superstructure and the outer walls of the pan, means carried by the bottom of the pans for engaging the ground and directing loose articles thereon outwardly from the plants of the row into the middles, and a crusher roll following the outer corner of each pan and passing over the loose articles shifted by said means.

In testimony whereof I hereunto affix my signature.

ROBERT H. STEVENS.